# United States Patent [19]

Latos et al.

[11] 4,409,121
[45] Oct. 11, 1983

[54] CORROSION INHIBITORS

[75] Inventors: Edwin J. Latos, Chicago; John C. Payne, Glendale Heights, both of Ill.

[73] Assignee: UOP Inc., Des Plaines, Ill.

[21] Appl. No.: 392,869

[22] Filed: Jun. 28, 1982

Related U.S. Application Data

[63] Continuation-in-part of Ser. No. 170,375, Jul. 21, 1980, abandoned.

[51] Int. Cl.³ .................... C23F 11/16; C23F 11/14; C23F 11/12; C23F 11/18
[52] U.S. Cl. ............................. 252/389 A; 106/14.12; 106/14.16; 106/14.17; 106/14.21; 106/14.42; 106/14.44; 252/8.55 E; 252/181; 422/15; 422/16; 422/18; 422/19
[58] Field of Search ............. 252/389 A, 8.55 E, 181; 106/14.12, 14.14, 14.15, 14.16, 14.17, 14.21, 14.42, 14.44; 422/15, 16, 18, 19

[56] References Cited

U.S. PATENT DOCUMENTS

| | | | |
|---|---|---|---|
| B 336,566 | 1/1975 | Powell | 252/389 A |
| 3,714,066 | 1/1973 | King et al. | 252/389 A |
| 3,723,347 | 3/1973 | Mitchell | 252/389 A |
| 3,992,318 | 11/1976 | Gaupp et al. | 252/389 A |
| 4,101,441 | 7/1978 | Hwa et al. | 252/389 A |
| 4,176,059 | 11/1979 | Suzuki | 252/389 A |
| 4,206,075 | 6/1980 | Boffardi | 252/389 A |
| 4,209,487 | 6/1980 | Hogue et al. | 252/389 A |
| 4,217,216 | 8/1980 | Lipinski | 252/389 A |

*Primary Examiner*—Irwin Gluck
*Attorney, Agent, or Firm*—James R. Hoatson, Jr.; Raymond H. Nelson; William H. Page, II

[57] ABSTRACT

Corrosion and scale-inhibiting compositions which are useful in recirculating aqueous systems comprise a mixture of a phosphate compound, a phosphonate compound comprising 1-hydroxyethylidene-1,1-diphosphonic acid or nitrilotris(methylene)triphosphonic acid, an aryl triazole, and a salt of a metal selected from the group consisting of molybdenum, tungsten and chromium. In the preferred embodiment of the invention, the phosphate compound is present in a weight percent ratio in the range of from about 2.5:1 to about 4:1 weight percent per weight percent of the metal salt. An example of an effective anti-corrosion composition comprises a mixture of sodium tripolyphosphate, 1-hydroxyethylidene-1,1-diphosphonic acid, benzotriazole and sodium molybdate, said composition being present in an amount of from about 5 to about 5,000 ppm.

10 Claims, No Drawings

CORROSION INHIBITORS

CROSS-REFERENCE TO RELATED APPLICATIONS

This application is a continuation-in-part of our copending application, Ser. No. 170,375 filed July 21, 1980, now abandoned, all teachings of which are incorporated herein.

BACKGROUND OF THE INVENTION

In many industrial applications, it is necessary to use aqueous solutions or water for a variety of purposes such as heat transfer systems in which the water is used in heat exchangers, cooling towers, chillers, etc. The water will come in contact with metal surfaces of the system and, when being used in a recirculating system after being exposed to or saturated with air, will have a tendency to corrode the metal surfaces with which it comes in contact. In addition, when utilizing water in a recirculating system, the metal salts which are inherently present in certain types of water such as calcium, magnesium, etc. will tend to deposit out on the surface of the metal to cause a scale. The presence of this scale on the surface of the metal will inhibit the heat transfer capability of the metal and thus reduce the efficiency of the system.

It is therefore imperative that the deposition of scale and the corrosion of the metal surfaces of the heat transfer equipment be minimized. The minimization of these problems can be accomplished by the addition of corrosion inhibitors to the water. In many instances different types of metals are used in the apparatus including iron in the form of steel, aluminum, copper, etc. Copper is known as an accelerator for the corrosion of iron and therefore any corrosion inhibitor must include a copper chelating component in order to again minimize the corrosion of the metal.

Several U.S. patents disclose different components which are used to inhibit the corrosion of metals in heat transfer systems.

Other U.S. patents also disclose various corrosion inhibiting compositions. For example, U.S. Pat. No. 3,723,347 claims the use of diamine phosphonate plus zinc compounds, triazoles and hexavalent chromates as well as a blend of silicates along with the diamine phosphonates while U.S. Pat. No. 4,209,487 is similar to this patent while teaching that the use of zinc salts and chromates which were used in the former patent have been found to adversely affect the quality of water when released in natural waters. Therefore, this reference omits the use of such compounds. Another U.S. Pat. No. 3,714,066 also discloses a similar corrosion inhibiting composition which utilizes a soluble zinc salt and an ethane diphosphonate. Other references such as U.S. Pat. No. 3,992,318 claim the use of phosphonates or diphosphonates in combination with phosphates and water-soluble polymers of acrylic or methacrylic acid; U.S. Pat. No. 4,101,441 discloses the use of a corrosion inhibitor consisting of an azole, a water-soluble phosphate and a water-soluble phosphonate; U.S. Pat. No. 4,176,059 claims the use of a corrosion inhibitor comprising a water-soluble molybdate ion, a surfactant, an inorganic water-soluble polyphosphate, and an azole; U.S. Pat. No. 4,217,216 claims the use of an azole, molybdate and a phosphonate, and states that when the molybdate was omitted, the inhibition of the corrosion was decreased. However, as will hereinafter be shown, when a molybdate is used in combination with the other elements of our corrosion inhibiting composition, the opposite is true and corrosion inhibition will be increased; while U.S. Pat. No. 4,206,075 and B-336-566 both claim the use of specific phosphonates as well as zinc, chromates and thiols or azoles as corrosion inhibitors. In all of the references, the corrosion rates are relatively high when compared to the corrosion rate of the present invention, said corrosion rates ranging from 1.1 up to 3.1 MPY.

It is noted that none of the references disclose the specific combination of the four components which make up the corrosion inhibiting compositions of the present invention. It was totally unexpected that by combining these components it was possible to prepare a composition which, in addition to possessing an inhibition rate greater than 99%, will also eliminate pitting or crevice corrosion of the metal surface.

BRIEF SUMMARY OF THE INVENTION

This invention relates to novel compositions which may be used as corrosion inhibitors. More specifically, the invention is concerned with novel compositions comprising an admixture of a phosphate compound, a phosphonate compound which possesses a desired stability, an aryl triazole and a salt of a metal selected from the group consisting of molybdenum, tungsten and chromium, said composition exhibiting superior properties in the ability to retard corrosion or pitting of metal surfaces which are used in heat transfer equipment such as cooling towers.

As hereinbefore set forth, various compositions of matter have been utilized to prevent the corrosion of metal surfaces, as well as the build-up of scale on said surface. It has now been discovered that certain compositions of matter of a type hereinafter set forth in greater detail will exhibit superior characteristics when compared to those which have been known in the prior art. These compositions will enable a heat transfer apparatus to be utilized for a longer period of time without having to shut down and replace any metal parts which have become corroded due to the presence of certain metal ions in water.

It is therefore an object of this invention to provide an improved corrosion inhibitor composition.

In one aspect, an embodiment of this invention is found in a composition for the prevention of corrosion comprising a mixture of a phosphate compound, a salt of a metal selected from the group consisting of molybdenum, tungsten and chromium, a phosphonate compound selected from the group consisting of nitrilotris(methylene)triphosphonic acid and 1-hydroxyethylidene-1,1-diphosphonic acid, and an aryl triazole.

A specific embodiment of the invention comprises a composition comprising a mixture of sodium tripolyphosphate, 1-hydroxyethylidene-1,1-diphosphonic acid, benzotriazole and sodium molybdate.

Other objects and embodiments will be found in the following further detailed description of the present invention.

As hereinbefore set forth, the present invention is concerned with an improvement in the corrosion inhibition activity of compositions of matter which can be obtained by utilizing a novel blend of various components. The use of various compounds as corrosion inhibitors is well known as evidenced by the many references hereinbefore discussed. However, we have now discovered that by blending a combination of four compounds, it is possible to obtain a corrosion inhibitor which exhibits an inhibition level greater than 99%, while at the same time eliminating the pitting or crevice corrosion which is still present when utilizing corrosion inhibition compositions disclosed in the past. The fact that the prior corrosion inhibitors have not overcome the pitting or crevice corrosion problems is evidenced by the fact that the references are silent as to the pitting inhibition characteristics of the inhibitors as well as the fact that in order to avoid the aforesaid pitting or crevice corrosions, a corrosion rate must be greater than 99% inhibition. Corrosion rates which are in the range of from about 95% to 97% inhibition imply the presence of pitting or crevice corrosion.

The various components present in corrosion inhibitor compositions have contributed in some extent to the general efficiency of the finished composition. For example, phosphonate compounds may function per se as corrosion inhibitors, but do so only at very high concentrations. This is true inasmuch as phosphonates in dilute solutions may or must be considered as corrosive in nature. In addition, generally speaking, phosphonate compounds possess a tendency to hydrolyze in an aqueous solution and the instability attendant thereto contributes to a breakdown of the efficiency of the corrosion inhibiting composition. We have now discovered that two particular phosphonate compounds, namely, 1-hydroxyethylidene-1,1-diphosphonic acid and nitrilotris(methylene)triphosphonic acid possess a high degree of stability when compared to the other phosphonate compounds. This stability when forming complexes with metals such as iron and copper permit the phosphonate to function as a threshold agent and thus contribute greatly to the high corrosion inhibition property of the compositions of the present invention.

The object of a corrosion inhibitor is primarily to prevent the combination of iron and oxygen to produce iron oxide and thus attack the surface of the metal which is being used in such structures as cooling towers. This is done by forming a passive film which inhibits the reaction. In this respect, the phosphate compound component of the corrosion composition of matter wil assist in this respect by forming an insoluble iron ion complex film on the surface of the metal such as steel, thus preventing the oxygenated water from reacting with iron present in the water to form the undesirable iron oxides and hydroxides.

As will hereinafter be shown, by combining four components of a type set forth in greater detail in which two of the components are present in the composition within a specified weight percent ratio, it has been found that a corrosion inhibitor may be prepared which will exhibit desirable characteristics in its ability to inhibit both surface corrosion and pitting or crevice corrosion. One component of the composition of matter of the present invention comprises a phosphate compound, specific examples of these compounds including sodium tripolyphosphate, potassium tripolyphosphate, lithium tripolyphosphate, tetrasodium pyrophosphate, tetrapotassium pyrophosphate, tetralithium pyrophosphate, rubidium tripolyphosphate, cesium tripolyphosphate, tetrarubidium pyrophosphate, tetracesium pyrophosphate, disodium orthophosphate, trisodium orthophosphate, dipotassium orthophosphate, tripotassium orthophosphate, dilithium orthophosphate, trilithium orthophosphate, etc.

The second component of the corrosion inhibitor composition of the present invention will comprise a phosphonate compound such as 1-hydroxyethylidene-1,1-diphosphonic acid or nitrilotris(methylene)triphosphonic acid, these phosphonate compounds exhibiting a greater stability of the type hereinbefore set forth with respect to other phosphonate compounds such as aminotri(ethylidene)phosphonic acid, aminotri(propylidene)phosphonic acid, etc. For example, in the case of 1-hydroxyethylidene-1,1-diphosphonic acid, the phosphonate compound will exhibit a high degree of hydrolytic stability, i.e. the resistance to decomposition in aqueous solutions at elevated temperatures and extremes in pH, and in addition will also exhibit chlorine stability. By utilizing the former phosphonates (the aforementioned di- and triphosphonic acids) it is possible to eliminate the use of other organic chelating agents and yet accomplish the desired result. These specific phosphonate compounds will also possess the desired properties of sequestration (ability to complex metal ions at stoichiometric concentrations), deflocculation (ability to disperse solid materials) and threshold effect (inhibition of precipitation at substoichiometric concentrations) in addition to their other desirable properties. The stability of these phosphonate compounds are also illustrated by their stability constants for iron and copper. For example, 1-hydroxyethylidene-1,1-diphosphonic acid has stability constants of log $K_e=33$ for Fe (III) ions and log $K_e=19$ for Cu (II) ions while nitrilotris(methylene)triphosphonic acid has stability constants of log $K_e=29$ for Fe (III) ions and log $K_e=13$ for Cu (II) ions.

The third component of the composition of the present invention comprises an aryl triazole such as 1,2,3-benzotriazole, 1,2,4-benzotriazole, 1,3,5-benzotriazole, 2,3,4-tolyltriazole, 2,3,5-tolyltriazole, etc.

The fourth component of this composition comprises a salt of a metal selected from the group consisting of molybdenum, tungsten and chromium. In particular, the salt of the metal is water-soluble in nature, specific examples of these salts including sodium molybdate, potassium molybdate, lithium molybdate, rubidium molybdate, cesium molybdate, sodium tungstate, potassium tungstate, lithium tungstate, rubidium tungstate, cesium tungstate, sodium chromate, potassium chromate, lithium chromate, rubidium chromate, cesium chromate, ammonium molybdate, ammonium tungstate, ammonium chromate, etc. It is also contemplated that molybdenum may be introduced into the mixture by utilizing molybdic acid as the source. Inasmuch as the final corrosion inhibitor composition will contain a sufficient amount of a caustic or basic compound to insure a pH of about 10 for said composition, it is possible to use the acid which will form a molybdate salt. It is to be understood that the after-mentioned phosphate compounds, phosphonate compounds, aryl triazoles and metal salts are only representative of the class of compounds which may be improved, and that the present invention is not necessarily limited thereto.

The four components of the mixture will be present therein in an amount of at least 0.5%, and not greater than about 50% of the composition. Preferred ranges will comprise from about 0.5% to about 7% of the phosphonate compound; from about 0.5% to about 8% of the phosphate compound; from about 0.5% to about 5% of the aryl triazole and from about 0.5% to about 7% by weight of the metal salt, the remainder of the final composition being water plus a caustic. In the preferred embodiment of the invention, the ratio of the phosphate compound to the metal salt of the type hereinbefore set forth will be within a controlled weight percent ratio. This weight percent ratio will be in a range of from about 2.5:1 to about 4:1 weight percent of phosphate compound per weight percent of a metal salt in which the metal is selected from the group consisting of molybdenum, tungsten and chromium. If the content of the metal salt is lower than that described in the range, the rate of corrosion inhibition will be correspondingly decreased. Likewise, if the weight percent of the phosphate compound is greater than that set forth in the above range, the corrosion inhibitor composition will behave as a straight phosphate-type corrosion inhibitor and will not exhibit the same characteristics as those which are possessed by the four-component corrosion inhibitor of the present invention.

The desired composition may be prepared by admixing all of the components and thereafter dissolving the components in water, plus the addition of a caustic substance. The latter is present in the event that the starting material comprises a metal acid, which, when reacted with the caustic substance, will provide the desired metal salt. It is contemplated within the scope of this invention that the corrosion inhibitor composition may also be utilized in solid form. When this form is desired, the four components are admixed in the proper proportions and thereafter added in this form to the heat transfer fluid, which usually comprises water.

The corrosion inhibitor composition in either solid or liquid form is added to the water system, so that the concentration of the composition in the water will be in a range of from about 5 to about 5,000 ppm. By utilizing the composition in this concentration, it is possible to inhibit the formation of scale on the surface of the equipment as well as preventing the corrosion by pitting or over-rusting the equipment. In the referenced embodiment of the invention, the various components will be present in the system in various ranges. For example, the phosphate compound will be present in such an amount so as to provide a concentration in the water system in the range of from about 2.9 to about 2,900 ppm. Likewise, the phosphonate compound will be present to provide a concentration in the water system of from about 1.44 to 1,440 ppm; the aryl triazole in a concentration of from about 0.72 to about 720 ppm and the salt of a metal of the type hereinbefore set forth in a concentration of from about 1.0 to about 1,000 ppm of the water system.

It is also contemplated within the scope of this invention that the final inhibitor composition may also contain, if so desired, a compound which will act as an anti-foulant or slit dispersant, although the presence of such a compound is not necessarily required for the ability of the remaining components of the composition to function as corrosion inhibitors. The anti-foulant or silt dispersants may comprise polyacrylate or polymethacrylate compounds such as sodium polyacrylate, potassium polyacrylate, sodium polymethacrylate, potassium polymethacrylate; polyacrylic acids having a molecular weight varying from about 800 to about 10,000; maleic acids such as polyethylene maleic acid, polystyrene maleic acid, etc. The aforementioned anti-foulants or slit dispersants will preferably be present in the final corrosion inhibitor composition in a range of from about 1 to about 5% by weight of the composition.

The following examples are given for purposes of illustrating the compositions of the present invention and to the increased efficiency by the use thereof. However, it is to be understood that the example are illustrative in nature only, and that the present invention is not necessarily limited thereto.

EXAMPLE I

The equipment which was used to perform the following experiments comprised a circulating loop having a 22 liter reservoir. In two legs of the loop, metal coupons, mounted on a Rulon holder comprising copper and steel, were inserted. In addition, at various other points in the loop, the apparatus was provided with a pH electrode connected to a pH meter, a dissolved oxygen electrode, a Corrosometer, thermocouples placed to monitor the temperature, a paddle wheel flowmeter and a pump for circulation of the test solution. The apparatus was washed twice at room temperature with a synthetic cooling tower water blend and once while maintaining the apparatus at a temperature of 140° F.

The particular corrosion inhibitor compositions were prepared by adding the particular compositions to the synthetic cooling tower water in a 5 gallon bottle. After thorough mixing, the solution was withdrawn from the bottle through a vacuum aspirator and passed into the circulating loop. After the blend was filled, the loop was brought to operating temperature, which in the experiments was 140° F., and the copper and steel coupons were inserted.

In the first test, a solution of sodium molybdate in a concentration of 100 ppm was tested for a total of 40 hours. In the second testing solution containing 100 ppm of sodium molybdate and 14.4 ppm of a phosphonate compound comprising 1-hydroxyethylidene-1,1-diphosphonic acid was treated for a period of 48 hours. In the third experiment, a solution containing 100 ppm of sodium molybdate, 14.4 ppm of the aforesaid phosphonate compound, and 29 ppm of sodium tripolyphosphate was treated for a period of 40 hours, and in the fourth test, a composition of the present invention, namely, a solution containing 10 ppm of sodium molybdate, 14.4 ppm of the phosphonate and 29.9 ppm of the tripolyphosphate salt, along with 7.2 ppm of benzotriazole, was tested for a period of 328 hours. The results of these tests are set forth in Table I below:

TABLE I

| pH | $O_2$ ppm | Corrosion Rate Steel | MPY Copper |
|---|---|---|---|
| 1. 7.4–7.8 | 5.4–5.5 | 74 | 2 |
| 2. 8 | 6.8–7.8 | 41 | 1.5 |
| 3. 7.9–8.1 | 6.5–6.6 | 11.5 | 1.2 |
| 4. 8.0–8.2 | | 0.81 | 0.21 | it is evident from a comparison of the above data that the corrosion inhibitor composition of the present invention exhibits markedly superior characteristics in that the corrosion rate as measured in mils per year (MPY) is significantly lower when compared to other corrosion inhibitors which do not contain all four components.

The corrosion rate for steel of 0.81 in MPY compares favorably to the best corrosion rate, again measured in mils per year (MPY), of the references which were previously discussed. For example, U.S. Pat. No. 3,723,347 which does not contain molybdate or phosphate is 3.1. Similarly, U.S. Pat. No. 3,714,066 which is similar to the aforementioned patent has a best corrosion rate of 2.1 MPY. U.S. Pat. No. 4,101,441 has a best corrosion rate of 1.7, but does not contain any molybdate. Likewise, U.S. Pat. No. 4,206,075 which has a similar composition to that of U.S. Pat. No. 3,723,347 has a best corrosion rate of 2.7 MPY. It is therefore apparent that a synergistic effect has been obtained by compounding the four components of the present invention, namely, a phosphate compound, a phosphonate compound, a salt of a metal such as molybdenum, tungsten, or chromium and an aryl triazole, in which the weight percent ratio of phosphate compound to metal salt is within the preferred range, with regards to the ability to inhibit corrosion of a steel or copper surface.

EXAMPLE II

To illustrate the efficiency of the corrosion inhibitor of the present invention, a comparison test was run in which a synthetic cooling tower water was subjected to a corrosion test. In test A, no inhibitor was used; in test B, a corrosion inhibitor prepared according to the method set forth in U.S. Pat. No. 4,176,059 was used; and in test C, the corrosion inhibitor of the present invention was present. The synthetic cooling tower water which was used in the test was similar to that employed in Example I and contained 224 ppm of magnesium chloride, 252 ppm of sodium bicarbonate, 503 ppm of sodium chloride, 740 ppm of sodium sulfate, and 183 ppm of calcium chloride. The ionic concentrations included 66 ppm of $Ca^{+2}$, 27 ppm of $Mg^{+2}$, 507 ppm of $Na^{+1}$, 183 ppm of $HCO_3^{-1}$, 500 ppm of $SO_4^{-2}$, and 500 ppm of $Cl^{-1}$. The operation parameters of the water included a total hardness of 275 ppm, a calcium hardness of 165 ppm, a magnesium hardness of 110 ppm and a M-alkalinity of 150 ppm. The total dissolved solids in the water was 1,776 ppm, said water having a pH at 130° F., in a range of from 7.0 to 7.6 and a pH at 72° of 7.6. The apparatus which was used was similar to that described in Example I above, while the temperature of the test was 130° F. The test coupons which were used measured ½"×3"×1/16" and the mils per year corrosion rate was calculated from weight loss measurements. The results of these tests are set forth in Table II below:

TABLE II

| Test | Steel Corrosion Rate MPY | Copper Corrosion Rate MPY |
|------|--------------------------|---------------------------|
| A    | 132                      | 1.7                       |
| B    | 112                      | 1.33                      |
| C    | 1.12                     | 0.3                       |

It is readily ascertainable from the above table that the formulation set forth in U.S. Pat. No. 4,176,059 possessed little or no activity in inhibiting the corrosion of steel and a limited activity in inhibiting the corrosion of copper. In contrast to this, the corrosion inhibitor of the present invention showed a significant improvement in corrosion-inhibiting activity with regards to both the steel and the copper coupons.

We claim as our invention:

1. Composition for the prevention of corrosion comprising a mixture of a phosphate compound, a salt of a metal selected from the group consisting of molybdenum, tungsten and chromium, a phosphonate compound selected from the group consisting of nitrilotris(methylene)triphosphonic acid and 1-hydroxyethylidene-1,1-diphosphonic acid, and an aryl triazole.

2. A composition as set forth in claim 1 in which said phosphate compound and said salt of a metal selected from the group consisting of molybdenum, tungsten and chromium are present in a ratio in the range of from about 2.5:1 to about 4:1 weight percent of phosphate compound per weight percent of metal salt.

3. A composition as set forth in claim 1 in which said phosphate compound is sodium tripolyphosphate.

4. A composition as set forth in claim 1 in which said phosphate compound is tetrasodium pyrophosphate.

5. A composition as set forth in claim 1 in which the salt of a metal is sodium molybdate.

6. A composition as set forth in claim 1 in which the salt of a metal is potassium molybdate.

7. A composition as set forth in claim 1 in which said aryl triazole is benzotriazole.

8. A composition as set forth in claim 1 in which said aryl triazole is tolyltriazole.

9. A composition as set forth in claim 1 in which said phosphonate compound is 1-hydroxyethylidene-1,1-diphosphonic acid.

10. A composition as set forth in claim 1 in which said phosphonate compound is nitrilotris(methylene)triphosphonic acid.

* * * * *